Figure 1:
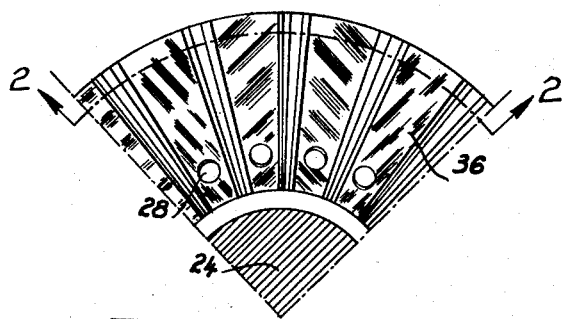

Nov. 19, 1957     F. E. BADIN     2,813,606
CENTRIFUGAL POWDER CLUTCHES
Original Filed March 28, 1951

INVENTOR:
Ferdinand Badin
by William J. Fox,
attorney

United States Patent Office 2,813,606
Patented Nov. 19, 1957

2,813,606

CENTRIFUGAL POWDER CLUTCHES

Ferdinand E. Badin, Paris, France, assignor to Societe Mediterraneenne, Miniere, Metallurgique et Commerciele, Paris, France, a corporation of France Original application March 28, 1951, Serial No. 217,927, now Patent No. 2,771,170, dated November 20, 1956. Divided and this application October 12, 1954, Serial No. 461,855

2 Claims. (Cl. 192—58)

The present invention has for its object centrifugal clutches operating by means of a granular or powdery material, hereinafter called "powder," which constitutes the connecting and torque transmitting element between the driving shaft or member and the driven one. This powder can consist of inorganic materials such as metals, or organic materials whether vegetable or synthetic.

It is known that clutches of this type are designed to ensure progressive coupling between two shafts, the clutch completely sliding at the start and the sliding gradually decreasing until it disappears, at normal speed.

In the various known powder clutches with two components, one of them being hollow and containing the other, the drive of one of the components by the other mainly results from the friction of these two components on a mass of powder inserted therebetween and held in position at the periphery by centrifugal force. In some cases friction is increased by different means or by dynamic circulation of the powder. Every known device has the disadvantage in that they either lack power under reasonable dimensions or they jam when operating so that the driven machine remains coupled when at rest. In the latter case, the power transmitted can be very high but the clutch operates neither steadily nor progressively.

In the powder clutch according to the invention, the driving or driven surfaces are so shaped as to chock up or wedge the powder, as a result of the relative motion of said surfaces, at predetermined places separated by intervals wherein the powder is not chocked up, or jammed, thus increasing automatic uncoupling of the clutch when stopped. For this purpose, according to the invention, the driving component and the driven one have oppositely located surfaces which limit at least one annular space containing powder, the surface of at least one of these components bearing distorted portions, which are preferably regularly distributed, at least one side of each of said portions forming an incline, so that the gap between these two components progressively decreases, on a level with or in the region of these distorted portions, at least in one direction of rotation, and then increases.

The annular space is most often included between the inner surface of a hollow part, hereinafter called "casing," and the peripheral surface of a part coaxial to the former one and hereinafter called "rotor"; either of these parts can be the driving component, the other one being the driven component. However, it is possible to design such annular spaces as substantially plane and included between two disks one of which is the driving component and the other the driven one.

As a rule, it is sufficient for either of the two parts of the clutch to bear the above-mentioned distorted portions, the other remaining cylindrical or plane as the case may be. When the annular space containing powder is cylindrical, the distorted portions are preferably carried by the rotor, the casing being cylindrical; thus is avoided the gathering, due to centrifugal force, in the would-be recesses of the casing, of powder whose mass would then be inactive.

When the driving part is rotated, the powder set in motion through contact gets distributed at the periphery of the annular space and is kept in this position by the centrifugal force. The inclines of the distorted portions give rise to the sliding of the powder layers and to the packing thereof in the narrow gaps. Thus chocking up is achieved in each narrow gap, of a powder heap which behaves as a solid mass substantially in the shape of a wedge and which secures the driving part to the driven one. However, this wedging up is limited, since the gap between the two parts, on a level with a distorted portion, widens out after crossing a minimum value; there is therefore no danger of jamming the clutch owing to binding or sticking of the particles in a narrow funnel, between the two opposite parts, and furthermore this clutch acts as a torque limiting device, which is an important feature.

In certain forms of the invention wherein the powder heaps are wedge-shaped, when the driving part slows down relatively to the driven one, the unchocking of the powder heaps is automatically achieved and as a consequence, this clutch is further able to free-wheel.

It is possible to give the distorted portions an asymmetrical shape, in other words a shape such that the gap between the driving part and the driven one, on a level with a distorted portion, gradually decreases in the direction of rotation and then suddenly increases.

In such a case, the distorted portions assume a shape similar to that of the teeth of a ratchet-wheel and the clutch only operates in a single direction of rotation.

It is also possible to give these distorted portions a symmetrical shape so that the gap gradually increases on both sides of the narrowest zone. The distorted portions assume, in this case, the shape of symmetrical flattened teeth, and the clutch is capable of operating in both directions of rotation.

When the motor is stopped, the field of centrifugal forces which keeps the cohesion of the powder heaps vanishes. Thus the stability of the powder heaps located in the restricted portions only depends on the own cohesion of this powder which can be very low. At rest, these powder heaps collapse by degrees and the smaller the base surface of the powder heaps compared with their height, i. e. the width of the gap at is narrowest part, the quicker this collapse.

Hence, in order to facilitate uncoupling when at rest the surfaces opposite one another of the driving part or of the driven one (or both) are partitioned, in the restricted gaps, by recesses, such as grooves, so as to limit the base surface of the heaps; these grooves may be directed, for instance, along planes perpendicular to the rotation axis. As these grooves do not contain compressed powder, they promote the collapse by degree of the heaps; they will be called hereinafter "decompression grooves."

In order to urge the flow of the powder towards the periphery and collection thereof in the restricted gaps of the annular space, at least one of the parts of the clutch can be provided with members for centrifugally guiding the powder, for instance grooves, blades or paddles, or else openings allowing passage from one side of the rotor to the other. In particular, these guide members can assume the shape of grooves which similarly to the decompression grooves, partition the restricted gaps.

In a convenient embodiment of the invention, the same set of grooves located in at least one of the parts of the clutch, gives rise to the periodic distortions of the peripheral surface of this part, and simultaneously acts as decompression grooves. Furthermore by giving these grooves a general radial direction, the centrifugal guiding of powder can be ensured by them. The machine of this part of the clutch is thus considerably simplified. This allows of increasing the number of grooves, i. e. of increasing the number of restricted gaps in the annular space, and as a result the number of powder heaps, thus enabling the clutch to transmit high powers with reduced overall dimensions.

In this case, the grooves preferably have a curved section and a relatively small depth. The lateral rims of these grooves constitute inclines for leading the powder towards the restricted gaps located between two consecutive grooves, whereas the edge limiting these grooves allows them of behaving as decompression grooves. These edges distinctly demarcate the base surfaces of the powder heaps which have thus a well-defined volume, thus permitting the power and the range of operation of the clutch.

The clutches according to the invention enhance chocking up of the powder between the two clutch parts for the transmission of power while, owing to the restricted zones wherein this powder is chocked up, automatic uncoupling, at rest, of the two parts is ensured.

Consequently, although the wedging up of powder is, for conventional clutches, a drawback which it was endeavored to avoid, on the contrary in the clutches of the invention, this wedging up, which is discerningly limited, is preferable and used with interest.

Other objects and advantages of the invention will be apparent during the course of the following description.

Figure 2:
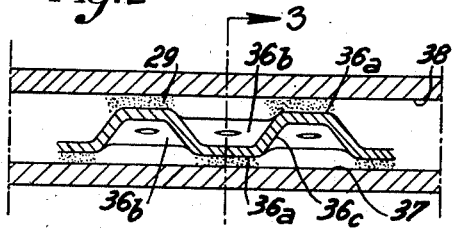
Figure 3:
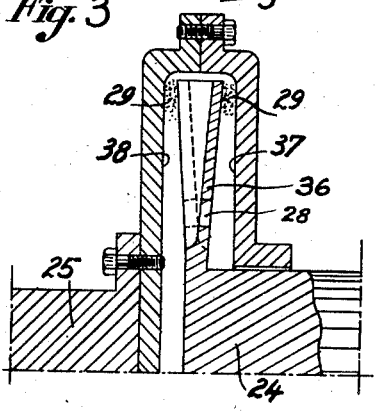
Figure 4:
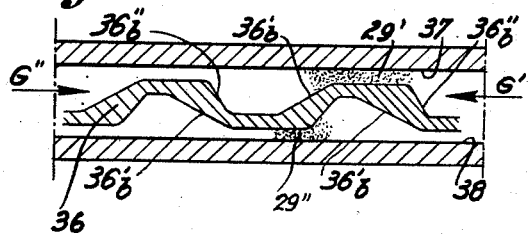

In the accompanying drawing forming a part of this application and in which like numerals are employed to designate like parts throughout the same, Fig. 1 is a view of a sector of rotor in a particularly simple form, Fig. 2 is a developed section taken along line 2—2 of Fig. 1, Fig. 3 is a section taken along line 3—3 of Fig. 2 and Fig. 4 is a section similar to that of Fig. 2 of a further form of clutch having different characteristics according to the direction of rotation and due to different slopes.

The clutch shown comprises a cylindrical casing designed for its coupling to a shaft. A rotor 36 is arranged inside this casing and concentrically thereto. This rotor is also fast with a hub designed to be coupled to a second shaft which is to be, in normal operation, gradually secured to the former one by the wedging up of the powder.

The annular space between the casing and the rotor contains a certain amount of powder of the kind commonly used in this type of clutch, for instance powder of graphited cast-iron. This powder can be introduced into the casing through a plug.

In the absence of powder, these two clutch parts can freely rotate relatively to one another owing to the insertion therebetween of a ball-bearing.

In the embodiment shown in Figs. 1 and 2, the rotor 36 is a mere disk whose surface bears regularly distributed radial distortions which widen out and deepen from the centre to the periphery.

Hence the protrusions on one of the faces of the disk correspond to the recesses on the other. On each face of the disk, these recesses 36a form, with the planar surfaces 37 and 38 of the casing, restricted gaps of constant width, whereas the recesses 36b form radial grooves for guiding the powder, their lateral sides forming inclines for leading this powder towards the restricted gaps. The base surface of the chocked up heaps of powder 29 which build up on each protrusion, is limited by the recesses on either side thereof, so that these heaps spontaneously collapse, at rest.

If the slopes of the sides 36c are equal in both directions, as shown in Fig. 2, the clutch operates identically in both directions of rotation. However, these sides may be differently slanted, as shown in Fig. 4. The sides 36'b are slightly sloping on both faces of the rotor, while the sides 36"b, also on both faces, are quite steep.

In this case, if the rotor 36 is driven in the direction of the arrow G' the smooth slope of the sides 36"b ensures gradual and quite slow drive of a large amount of powder into the restricted gaps; the clutch slides during a while, but the heaps of powder 29' which are relatively wide and strongly packed can transmit a great power. On the other hand, if the rotor 36 is driven in the direction of the arrow G", a smaller and narrower heap of powder 29" than in the former case is more rapidly chocked up in the restricted gaps, so that coupling is very quickly achieved but the power the clutch is capable of transmitting is much lower.

Consequently, a clutch such as illustrated in Fig. 4 allows of obtaining, in anticlockwise rotation, operation under load of a machine (direction G') with progressive transmission of power and strong coupling, and in clockwise rotation, no load return of this machine (direction G") with quick action coupling.

This application is a division of my copending application Serial No. 217,927, filed on March 28, 1951, now Patent No. 2,771,170, dated November 20, 1956.

I claim:

1. A centrifugal powder clutch of the sort employing a subdivided solid material as a fluid coupling medium comprising a hollow rotatable casing defining a cavity serving to contain a quantity of medium and to enclose a rotor, a rotor within said casing and coaxial therewith, said rotor and casing being relatively turnable, a finely-divided medium in the casing in an amount insufficient to completely fill the casing and adapted, by centrifugal action, to dispose the medium packingly in the peripheral portions of the cavity when the cavity is rotated about its axis, the rotor having in its peripheral portions a plurality of radial corrugations circumferentially disposed as protrusions increasing in both width and depth toward the periphery of the rotor, and disposed alternatively on opposite sides of the rotor, the protrusions thereby forming a plurality of restrictions between the rotor and the casing, the restrictions being smallest at the periphery of the rotor.

2. A centrifugal powder clutch according to claim 1, in which the radially circumferentially disposed grooves and protrusions of the rotor are formed with each groove on one side of the rotor forming a protrusion on the other side.

References Cited in the file of this patent

UNITED STATES PATENTS

| 1,887,610 | Widegren et al. | Nov. 15, 1932 |

FOREIGN PATENTS

| 637,442 | France | Jan. 30, 1928 |
| 46,612 | Denmark | Nov. 29, 1932 |
| 336,320 | Italy | Feb. 14, 1936 |